(12) United States Patent
Unno et al.

(10) Patent No.: US 10,991,505 B2
(45) Date of Patent: Apr. 27, 2021

(54) COIL UNIT CONNECTION STRUCTURE

(71) Applicant: THK CO., LTD., Tokyo (JP)

(72) Inventors: Akihiro Unno, Tokyo (JP); Hirofumi Suzuki, Tokyo (JP)

(73) Assignee: THK CO., LTD., Tokyo (JP)

( * ) Notice: Subject to any disclaimer, the term of this patent is extended or adjusted under 35 U.S.C. 154(b) by 0 days.

(21) Appl. No.: 16/611,574

(22) PCT Filed: Apr. 19, 2018

(86) PCT No.: PCT/JP2018/016096
§ 371 (c)(1),
(2) Date: Nov. 7, 2019

(87) PCT Pub. No.: WO2018/207584
PCT Pub. Date: Nov. 15, 2018

(65) Prior Publication Data
US 2020/0098510 A1  Mar. 26, 2020

(30) Foreign Application Priority Data

May 10, 2017  (JP) .............................. JP2017-093611

(51) Int. Cl.
*H01F 27/29* (2006.01)
*H01F 27/06* (2006.01)
(Continued)

(52) U.S. Cl.
CPC ............. *H01F 27/29* (2013.01); *H01F 27/06* (2013.01); *H01F 27/24* (2013.01); *H01F 38/14* (2013.01)

(58) Field of Classification Search
None
See application file for complete search history.

(56) References Cited

U.S. PATENT DOCUMENTS 4,836,344 A * 6/1989 Bolger .................... B60L 5/005
191/10
2013/0233663 A1  9/2013 Czainski et al.
(Continued)

FOREIGN PATENT DOCUMENTS

| CA | 1300698 A | 5/1992 |
|----|-----------|--------|
| CN | 107206916 A | 9/2017 |

(Continued)

OTHER PUBLICATIONS

Notification of Reason for Refusal, dated Dec. 2, 2019, from corresponding Korean application No. 10-2019-7033265.
(Continued)

*Primary Examiner* — Ronald Hinson
(74) *Attorney, Agent, or Firm* — Nixon & Vanderhye

(57) ABSTRACT

A coil unit connection structure is provided which can integrate locations connected to a power cable into one side in an arrangement direction of a plurality of coil units. In a coil unit connection structure that electrically connects a plurality of coil units, each of the coil units includes a coil and a return wire. A plurality of the coils of the plurality of coil units is electrically connected to each other. A plurality of the return wires of the plurality of coil units is electrically connected to each other. A terminal unit is provided which includes a connecting wire that electrically connects the coil and the return wire of the coil unit at the terminal end.

8 Claims, 10 Drawing Sheets

(51) Int. Cl.
    *H01F 27/24*     (2006.01)
    *H01F 38/14*     (2006.01)

(56) References Cited

U.S. PATENT DOCUMENTS

| | | |
|---|---|---|
| 2013/0320753 A1 | 12/2013 | Kim et al. |
| 2015/0372498 A1 | 12/2015 | Ichikawa et al. |
| 2016/0137072 A1 | 5/2016 | Lee et al. |
| 2016/0229296 A1 | 8/2016 | Hosek et al. |

FOREIGN PATENT DOCUMENTS

| | | |
|---|---|---|
| EP | 289868 A2 | 11/1988 |
| JP | S64-39202 A | 2/1989 |
| JP | H03-57734 A | 3/1991 |
| JP | H05-336607 A | 12/1993 |
| JP | H08-140331 A | 5/1996 |
| JP | 2018-512032 A | 4/2018 |
| KR | 2013-0134870 A | 12/2013 |
| KR | 2016-0057577 A | 5/2016 |
| KR | 20170116082 A | 10/2017 |
| KR | 20180004313 A | 1/2018 |
| WO | 2016/127152 A1 | 8/2016 |

OTHER PUBLICATIONS

International Search Report, dated Jul. 31, 2018, from corresponding PCT application No. PCT/JP2018/016096.
Office Action issued in German Patent Application No. 11 2018 002 410.5 dated Oct. 28, 2020.

\* cited by examiner

COIL UNIT CONNECTION STRUCTURE

TECHNICAL FIELD

The present invention relates to a coil unit connection structure that electrically connects a plurality of coil units.

BACKGROUND ART

A wireless power transfer apparatus that transfers electric power between a primary coil that transmits power and a secondary coil that receives power is known (refer to, for example, Patent Literature 1). When an alternating current is passed through the primary coil, a magnetic field is created around the primary coil, and an induced electromotive force occurs in the secondary coil due to the magnetic flux passing through the secondary coil. In this wireless power transfer apparatus, a plurality of coil units as the primary coils may be arranged in a moving direction of the secondary coil to electrically connect the plurality of coil units. This is for causing the secondary coil to face any of the plurality of coil units even when the secondary coil moves, which enables power to continue to be transferred to the secondary coil.

Other than in the wireless power transfer apparatus, in, for example, a motor, a transformer, and various electronic devices, a plurality of coil components (that is, coil units) may be electrically connected.

CITATION LIST

Patent Literature

Patent Literature 1: JP H08-140331 A

SUMMARY OF INVENTION

Technical Problem

However, in a known coil unit connection structure where a plurality of coil units is electrically connected, power cables (for example, a cable L on the go side of power and a cable N on the return side of power) are connected to both ends in an arrangement direction of the coil units. Accordingly, there is a problem that it is difficult to carry out the wiring of the power cables. Moreover, the length of the coil units varies depending on the number of the coil units. Accordingly, there is also a problem that the length of the power cable needs to be changed.

Hence, an issue of the present invention is to provide a coil unit connection structure that allows integrating locations connected to a power cable into one side in an arrangement direction of a plurality of coil units.

Solution to Problem

In order to solve the above issue, an aspect of the present invention is a coil unit connection structure for a plurality of coil units. Each coil unit includes a coil and a return wire. A plurality of the coils of the plurality of coil units is electrically connected to each other. A plurality of the return wires of the plurality of coil units is electrically connected to each other.

Advantageous Effects of Invention

According to the aspect of the present invention, it is possible to integrate locations connected to a power cable into one side in an arrangement direction of the plurality of coil units.

DESCRIPTION OF EMBODIMENTS

Embodiments of a coil unit connection structure of the present invention are described in detail hereinafter with reference to the accompanying drawings. However, the coil unit connection structure of the present invention can be embodied in various forms, and is not limited to the embodiments described in the description. The embodiments are provided with the intention of allowing those skilled in the art to fully understand the scope of the invention by fully disclosing the description.

First Embodiment

Figure 1:
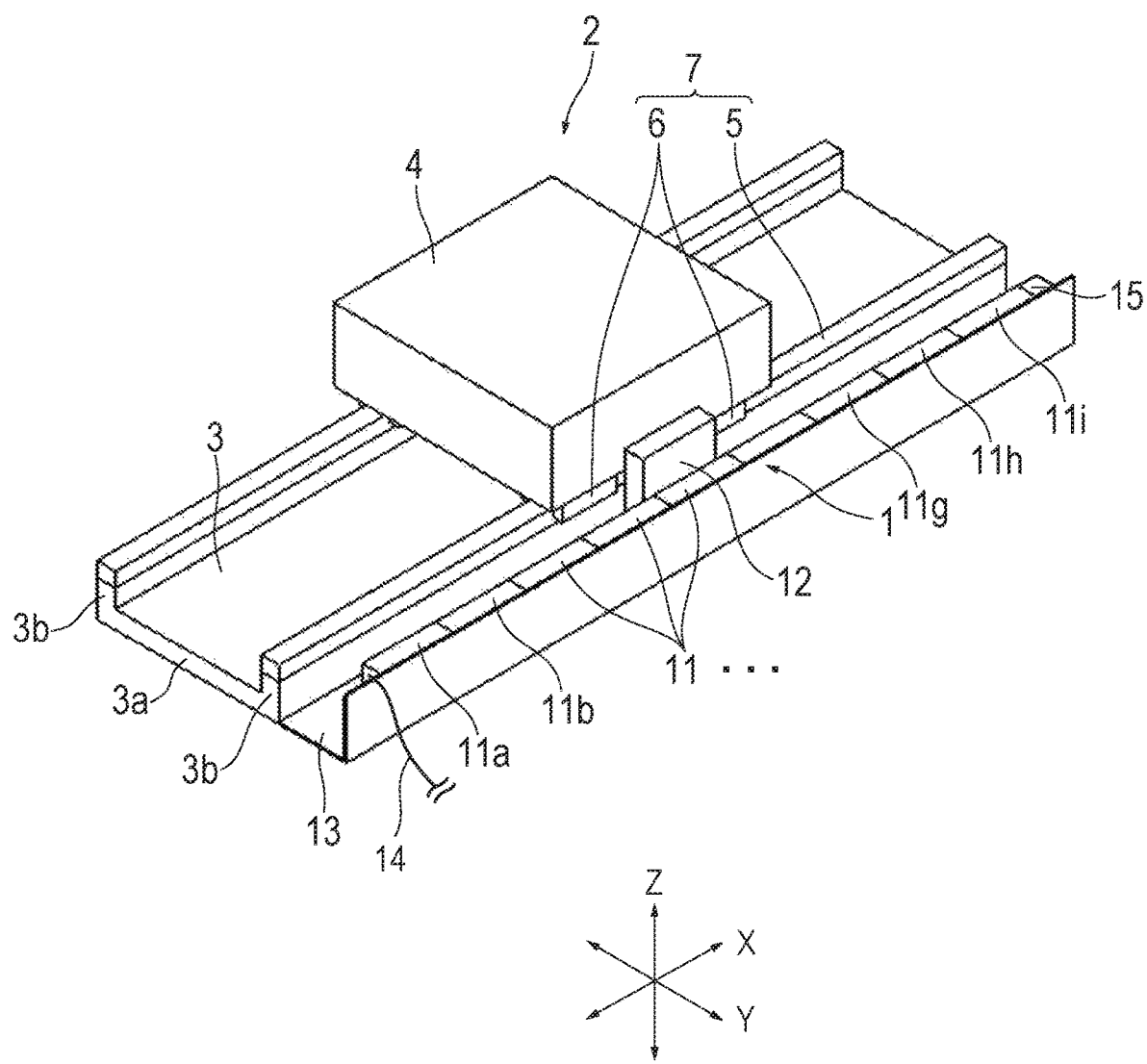
FIG. 1 is a perspective view of an X table into which a coil unit connection structure of a first embodiment of the present invention is incorporated.

FIG. 1 illustrates a perspective view of an X table 2 into which a coil unit connection structure of a first embodiment of the present invention is incorporated. The X table 2 includes a base 3, a table 4, linear guides 7 that guide the table 4 in such a manner as to allow the table 4 to move in an X direction, a linear motor 8 (refer to FIG. 2) that drives the table 4 in the X direction, a driver 9 (refer to FIG. 2) that supplies electric power suitable to control the linear motor 8, and a wireless power transfer apparatus 1 that supplies electric power to the driver 9. For convenience of description, the configuration of the X table 2 is described below, using X, Y, and Z directions illustrated in FIG. 1.

The base 3 extends in the X direction. The base 3 includes a bottom portion 3a, and a pair of side walls 3b that face each other and are provided at both ends of the bottom portion 3a in the Y direction. The base 3 has a U-shape in Y-Z cross-section. The linear guide 7 is provided on an upper surface of the side wall 3b.

The linear guide 7 includes a rail 5 that is attached to the upper surface of the side wall 3b and extends in the X direction, and a carriage 6 assembled to the rail 5 in such a manner as to be movable in the X direction. A plurality of rolling elements is disposed between the carriage 6 and the rail 5 in such a manner as to be capable of rolling motion to allow the carriage 6 to move smoothly. The table 4 is attached to an upper surface of the carriage 6.

Figure 2:
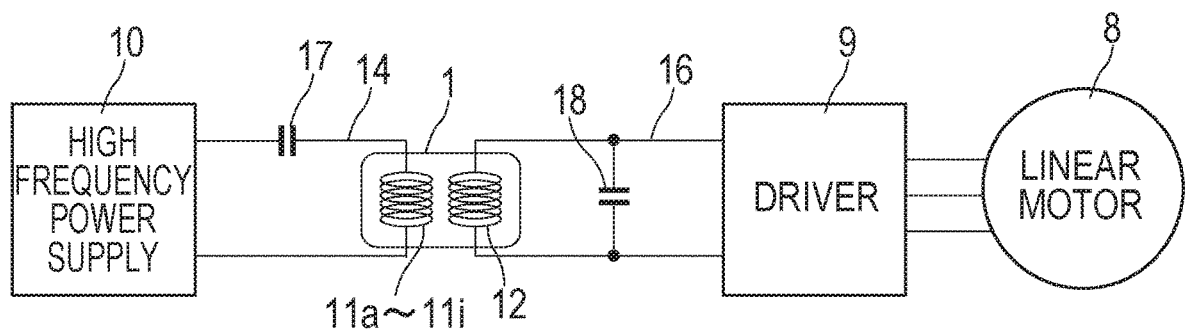
FIG. 2 is a configuration diagram of an electrical system of the X table.

The table 4 is driven by the linear motor 8 (refer to FIG. 2). The linear motor 8 includes a field magnet unit that is attached to, for example, the base 3, and has a plurality of permanent magnets, and an armature unit attached to the table 4. The driver 9 (refer to FIG. 2) is also attached to the table 4.

The wireless power transfer apparatus 1 includes a main body 13 that is attached to the base 3 and extends in the X direction, a plurality of primary coils 11a to 11i as a plurality of coil units attached to the main body 13, and a secondary coil 12 attached to the table 4. The primary coils 11a to 11i are arranged in the X direction. Adjacent coils 11a and 11b, 11b and 11c, . . . are electrically connected to each other. The primary coils 11a to 11i are detachably attached to the main body 13 by a fastening member such as a bolt. A terminal unit 15 is placed adjacently to the primary coil 11i at a terminal end (one end in the X direction). A power cable 14 is connected to the primary coil 11a at a starting end (the other end in the X direction).

The secondary coil 12 faces the primary coils 11a to 11i, spaced apart from them. The secondary coil 12 moves together with the table 4 in the X direction. Even if moving in the X direction, the secondary coil 12 faces any of the primary coils 11a to 11i.

FIG. 2 illustrates a configuration diagram of an electrical system of the X table 2 of the embodiment. A high frequency power supply 10 is connected via the power cable 14 to the primary coils 11a to 11i of the wireless power transfer apparatus 1. FIG. 2 illustrates only one primary coil. However, the plurality of primary coils 11a to 11i is connected in series in reality. The driver 9 is connected to the secondary coil 12 via a cable 16. A primary resonant capacitor 17 is connected in series with the primary coils 11a to 11i. A secondary resonant capacitor 18 is connected in parallel with the secondary coil 12.

When the high frequency power supply 10 supplies high frequency power to the primary coils 11a to 11i, high frequency magnetic fields are created around the primary coils 11a to 11i, and an induced electromotive force occurs in the secondary coil 12 due to the magnetic flux passing through the secondary coil 12. The power occurring in the secondary coil 12 is supplied to the driver 9. The driver 9 supplies the power suitable for control to the linear motor 8. The linear motor 8 converts the power supplied from the driver 9 into motive power.

Figure 3A:
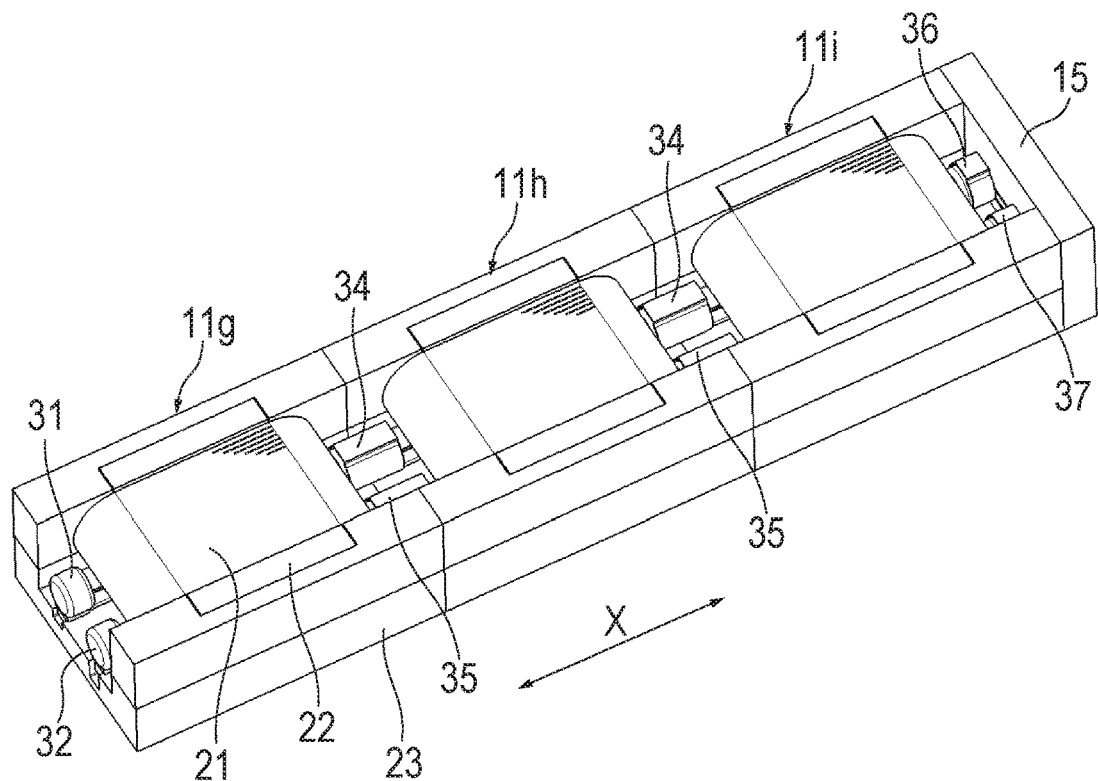
FIG. 3 is perspective views of a connection structure of coil units (primary coils) of the first embodiment (FIG. 3A is a perspective view of three primary coils on a terminal end side, and FIG. 3B is an exploded perspective view of the primary coil at the terminal end).
Figure 3B:
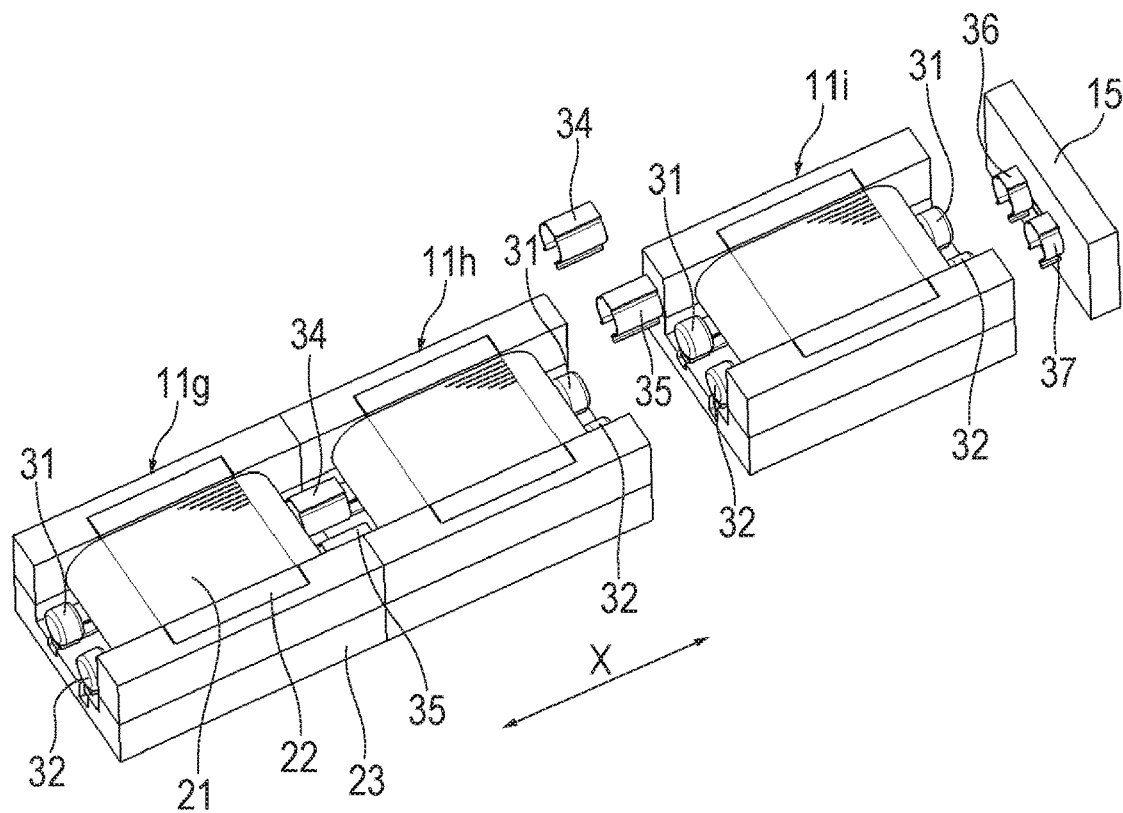

FIGS. 3A and 3B illustrate perspective views of the coil unit connection structure of the embodiment. FIG. 3A illustrates a perspective view of three primary coils 11g, 11h, and 11i on the terminal end side. FIG. 3B illustrates an exploded perspective view of the primary coil 11i at the terminal end. FIGS. 3A and 3B illustrate a state where the primary coils 11g, 11h, and 11i of FIG. 1 are rotated 90 degrees clockwise.

Each of the primary coils 11a to 11i includes a coil 21, a core 22 around which the coil 21 is wound, and a coil base 23 that supports the core 22.

Figure 4:
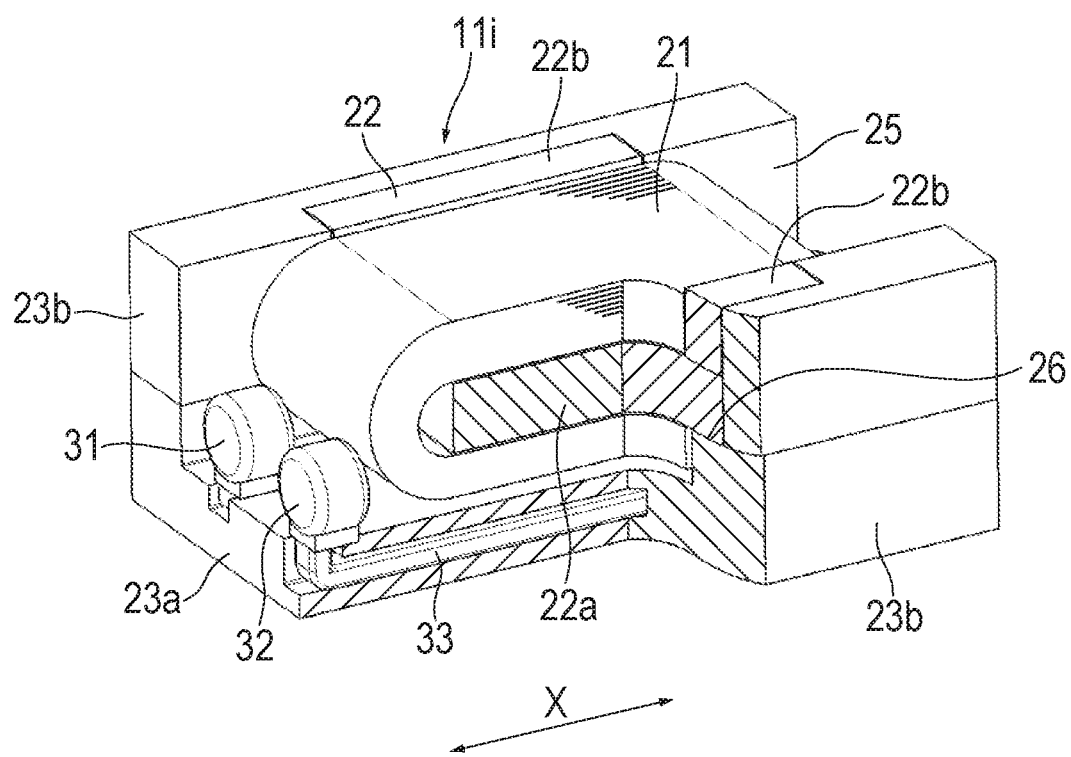
FIG. 4 is a perspective view (including a partial cross-sectional view) of the primary coil of the first embodiment.

FIG. 4 illustrates a perspective view (including a partial cross-sectional view) of the primary coil 11i. The configurations of the primary coils 11a to 11i are the same. Accordingly, the primary coil 11i is described here as a representative. The coil base 23 includes a bottom portion 23a, and a pair of side walls 23b that face each other and are provided at both ends of the bottom portion 23a in a width direction thereof. In the embodiment, the side wall 23b is divided into two: an upper part and a lower part. However, the side wall 23b can also be formed as a single piece. The coil base 23 has a U-shape in a cross-section orthogonal to the X direction. The bottom portion 23a and the side walls 23b of the coil base 23 form a recess 25. The coil 21 is housed in the recess 25.

The core 22 includes a bottom portion 22a, and a pair of side walls 22b that face each other and are provided at both ends of the bottom portion 22a in a width direction thereof. The core 22 also has a U-shape in a cross-section orthogonal to the X direction. A notch 26 where the core 22 is housed is formed in the side wall 23b of the coil base 23.

The bottom portion 23a of the coil base 23 is provided with a pair of first terminals 31 and a pair of second terminals 32 (refer also to FIG. 3B). Each of the first terminal 31 and the second terminal 32 is formed of a rod-like (that is, a short cylindrical) conductor. Both ends of the coil 21 are electrically connected to the first terminals 31 by, for example, soldering. Both ends of a return wire 33 are electrically connected to the second terminals 32 by, for example, soldering. The return wire 33 is provided to the bottom portion 23a of the coil base 23 in a state of being insulated from the coil 21. The return wire 33 is a lead (that is, a short-circuit wire) that connects between the pair of second terminals 32 with low resistance.

As illustrated in FIG. 3B, the first terminals 31 of the adjacent primary coils 11g and 11h, and 11h and 11i are electrically connected to each other via detachable first relays 34. The second terminals 32 of the adjacent primary coils 11g and 11h, and 11h and 11i are electrically connected to each other via detachable second relays 35. The same shall apply to the remaining primary coils 11a to 11f.

Figure 5:
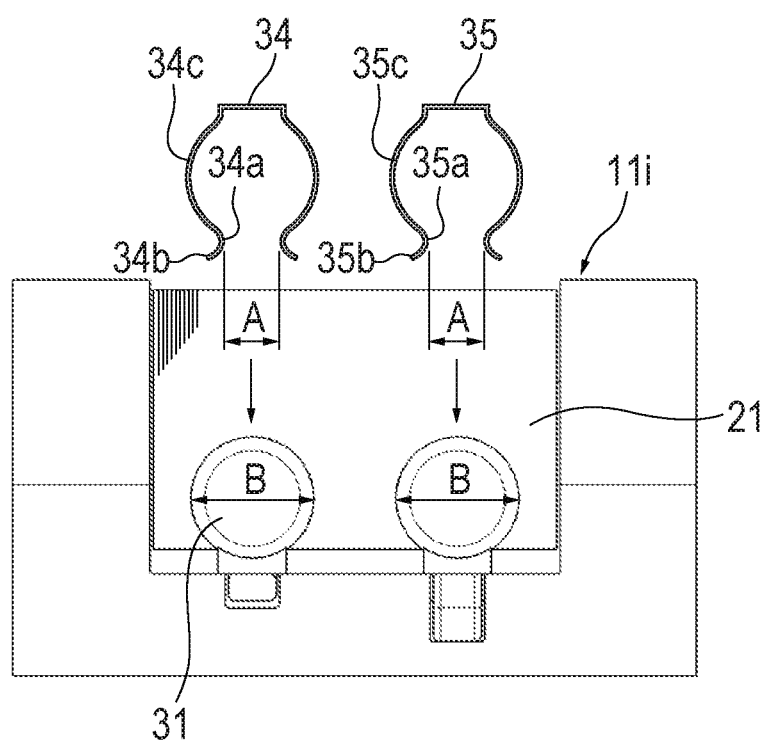
FIG. 5 is a front view of the primary coil of the first embodiment.

As illustrated in a front view of the primary coil 11i of FIG. 5, the first relay 34 has a substantially tubular shape into which the first terminal 31 fits, and also includes an expandable opening 34a through which the first terminal 31 is inserted in a direction orthogonal to an axial direction (an up-and-down direction in FIG. 5). A width A of the opening 34a is less than a diameter B of the first terminal 31. When the first relay 34 is fitted to the first terminal 31, the first relay 34 deforms in such a manner as to expand the opening 34a. The first relay 34 then recovers its original shape in such a manner as to narrow the opening 34a. Ends 34b of the opening 34a spread outward to allow easy fitting of the first terminal 31 into the first relay 34. A conductor is provided on an inner surface of an outer periphery 34c of the first relay 34. An insulator is provided on an outer surface of the outer periphery 34c of the first relay 34. The second relay 35 also includes an outer periphery 35c, an opening 35a, and ends 35b as in the first relay 34.

As illustrated in FIG. 3B, the terminal unit 15 includes a substantially tubular first terminal 36, a substantially tubular second terminal 37, and a connecting wire 38 (refer to FIG. 6) that electrically connects the first terminal 36 and the second terminal 37. The connecting wire 38 is a lead with low resistance. The first terminal 36 and the second terminal 37 of the terminal unit 15 are fitted to the first terminal 31 and the second terminal 32 of the primary coil 11i at the terminal end, respectively. The terminal unit 15 short-circuits the coil 21 and the return wire 33 (refer to FIG. 4) of the primary coil 11i at the terminal end. Instead of the terminal unit 15, a connecting wire that electrically connects the first terminal 31 and the second terminal 32 can also be provided to the primary coil 11i at the terminal end.

Figure 6:
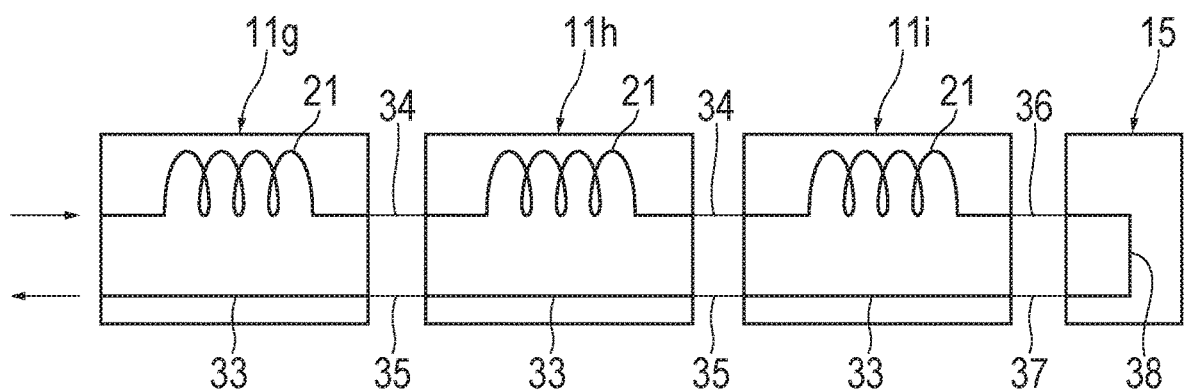
FIG. 6 is a connection diagram of the primary coils of the first embodiment.

According to the coil unit connection structure of the embodiment, the following effects are exerted: As illustrated in FIG. 6, the coils 21 of the primary coils 11g to 11i are electrically connected by the first relays 34. The return wires 33 of the primary coils 11g to 11i are electrically connected by the second relays 35. The same shall apply to the remaining primary coils 11a to 11f. The coil 21 and the return wire 33 of the primary coil 11i at the terminal end are short-circuited by the terminal unit 15. Hence, locations connected to the power cable 14 can be integrated into one side in the arrangement direction of the primary coils 11a to 11i (that is, one side of the primary coil 11a at the starting end).

The terminal unit 15 including the connecting wire 38 that electrically connects the first terminal 36 and the second terminal 37 is provided to allow making the configurations of the primary coils 11a to 11i the same.

The first terminals 31 of the adjacent primary coils 11a and 11b, 11b and 11c . . . are electrically connected to each other via the first relays 34. The second terminals 32 of the adjacent primary coils 11a and 11b, 11b and 11c . . . are electrically connected to each other via the second relays 35. Accordingly, only any one of the primary coils 11a to 11i of the plurality of primary coils 11a to 11i can be easily removed from the main body.

The first terminal 31 and the second terminal 32 are rod-like, and the first relay 34 and the second relay 35 are substantially tubular, and also the expandable openings 34a and 35a are provided. Accordingly, the first terminal 31 and the second terminal 32 can be easily fitted into the first relay 34 and the second relay 35. Moreover, crimping and screwing are not required. Accordingly, the contact point has less electrical resistance, and the power loss is reduced.

Each of the primary coils 11a to 11i includes the core 22 around which the coil 21 is wound, and the coil base 23 that supports the core 22. Accordingly, it is possible to support the coil 21 in a stable state.

Second Embodiment

Figure 7:
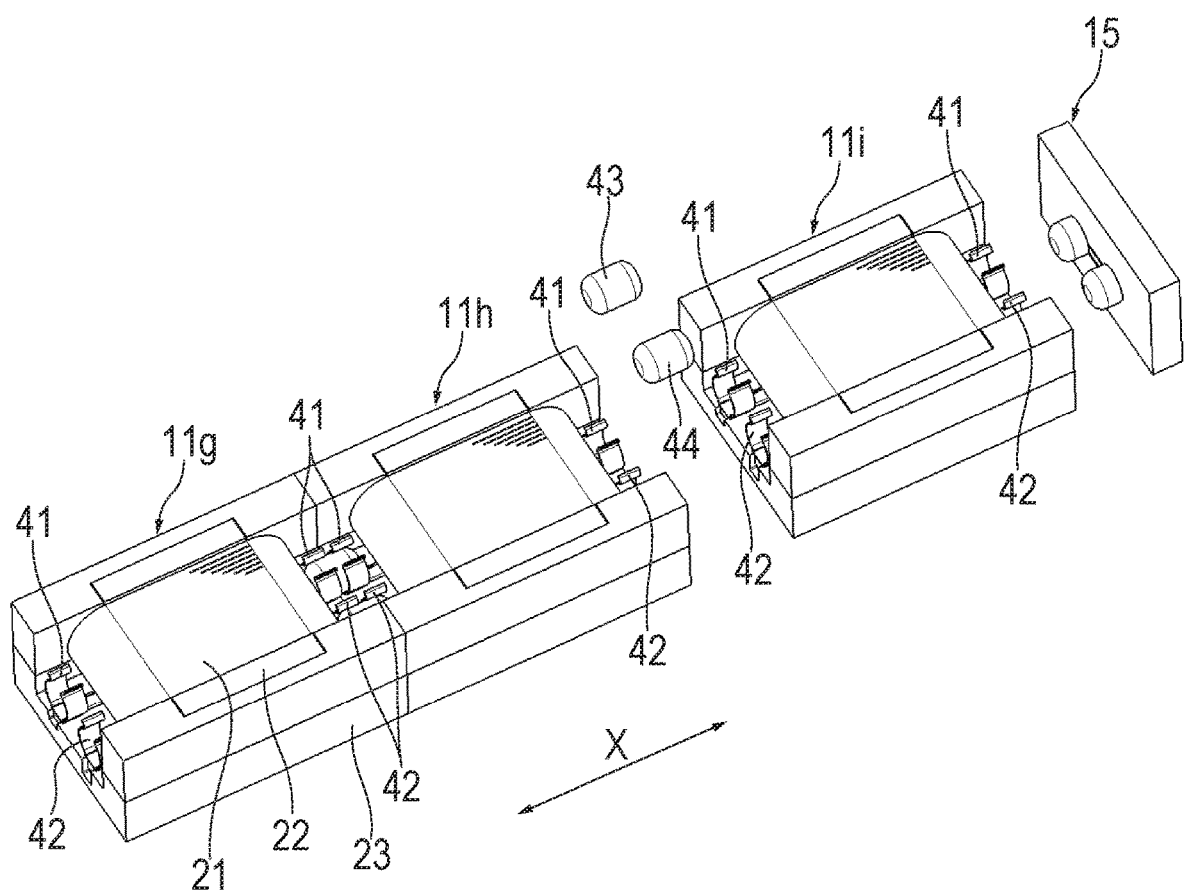
FIG. 7 is a perspective view of a coil unit connection structure of a second embodiment.

FIG. 7 illustrates a perspective view of a coil unit connection structure of a second embodiment of the present invention. FIG. 7 illustrates an exploded perspective view of the primary coil 11i at the terminal end as in FIG. 3B.

The second embodiment is different from the first embodiment in the respects that first terminals 41 and second terminals 42 of the primary coils 11g to 11i are substantially tubular, and first relays 43 and second relays 44 are rod-like. The other configurations are the same as those of the first embodiment. Accordingly, the same reference signs are assigned, and descriptions thereof are omitted.

Figure 8:
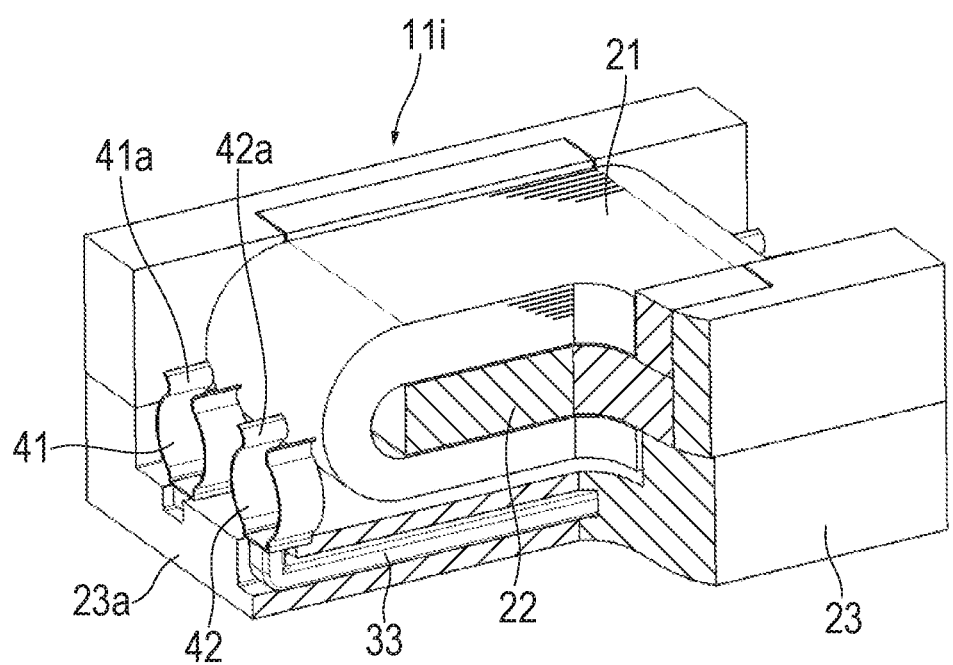
FIG. 8 is a perspective view (including a partial cross-sectional view) of a primary coil of the second embodiment.

FIG. 8 illustrates a perspective view (a partial cross-sectional view) of the primary coil 11i. The bottom portion 23a of the coil base 23 is provided with the first terminals 41 and the second terminals 42. Both ends of the coil 21 are electrically connected to the first terminals 41 by, for example, soldering. Both ends of the return wire 33 are electrically connected to the second terminals 42 by, for example, soldering. The first terminal 41 has a substantially tubular shape into which the rod-like first relay 43 fits, and includes an expandable opening 41a through which the first relay 43 is inserted in a direction orthogonal to an axial direction. The second terminal 42 also has a substantially tubular shape, and includes an opening 42a.

Third Embodiment

Figure 9:
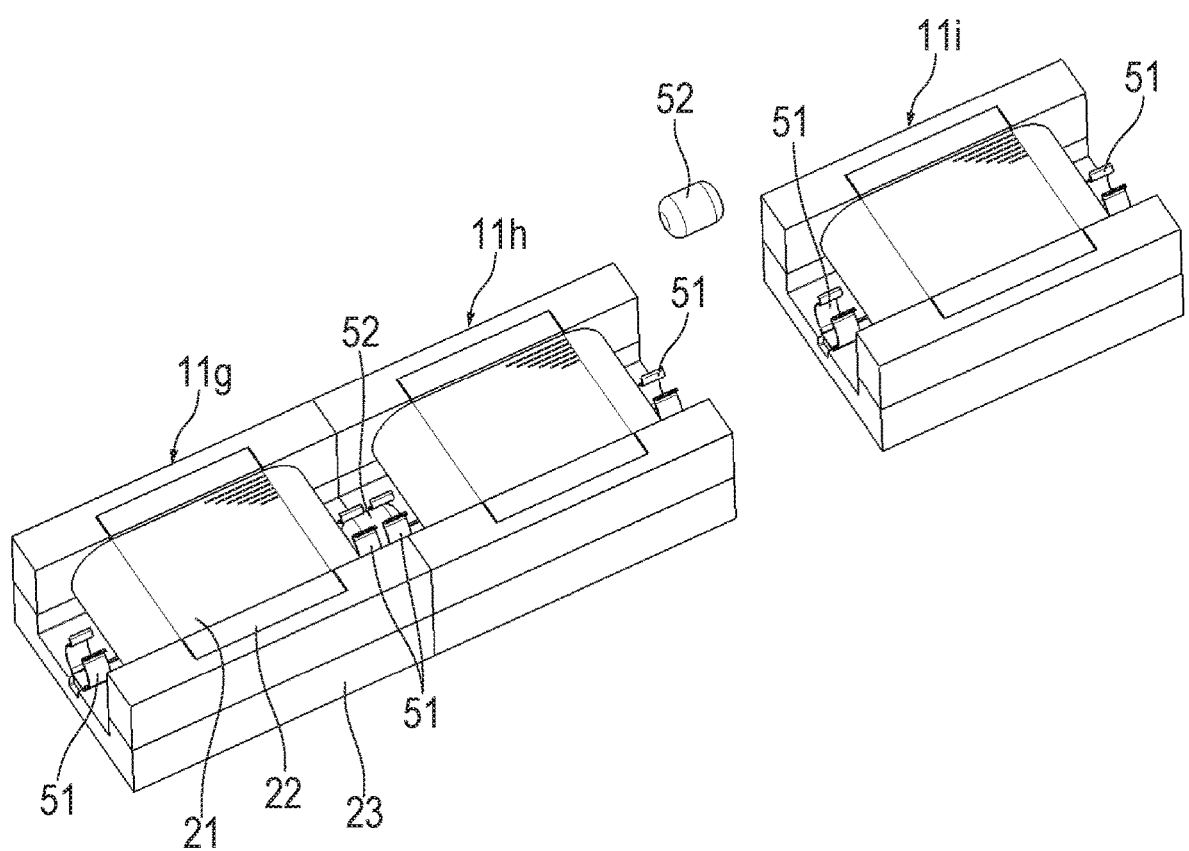
FIG. 9 is a perspective view of a coil unit connection structure of a third embodiment.

FIG. 9 illustrates a perspective view of a coil unit connection structure of a third embodiment of the present invention. FIG. 9 illustrates an exploded perspective view of the primary coil 11i at the terminal end as in FIG. 3B.

The third embodiment is different from the first embodiment in the respect that the coil bases 23 of the primary coils 11g to 11i are provided with only substantially tubular first terminals 51 electrically connected to the coils 21. The first terminals 51 of the adjacent primary coils 11g and 11h, and 11h and 11i are electrically connected to each other via detachable rod-like first relays 52. The same shall apply to the remaining primary coils 11a to 11f. The other configurations are substantially the same as those of the first embodiment. Accordingly, the same reference signs are assigned, and descriptions thereof are omitted. It is also possible to form the first terminal 51 into a rod-like shape and form the first relay 52 into a substantially tubular shape.

Figure 10:
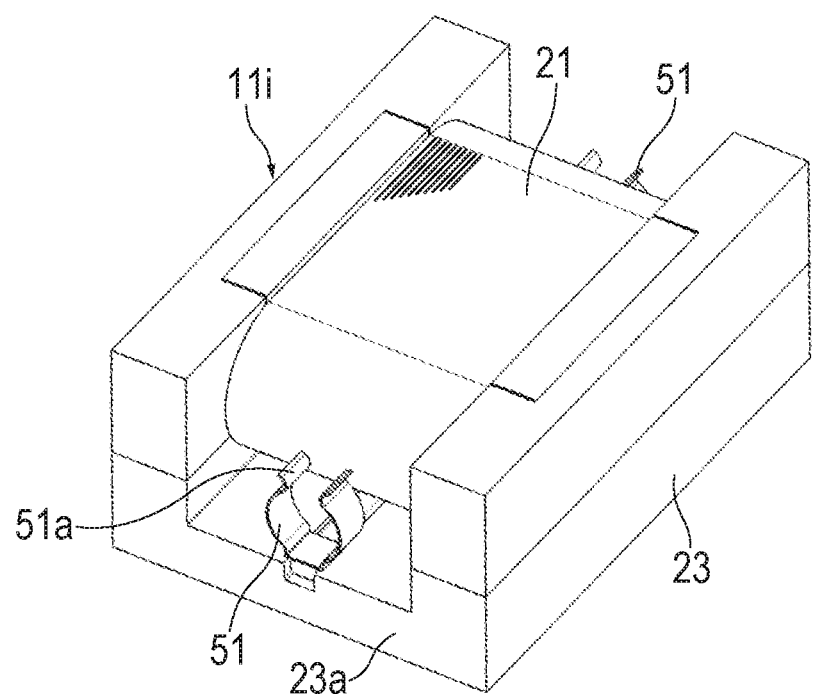
FIG. 10 is a perspective view of a primary coil of the third embodiment.

FIG. 10 illustrates a perspective view of the primary coil 11i. The bottom portion 23a of the coil base 23 is provided with the first terminals 51. The first terminal 51 has a substantially tubular shape that fits to the first relay 52, and includes an expandable opening 51a through which the first relay 52 is inserted in a direction orthogonal to an axial direction. Both ends of the coil 21 are electrically connected to the first terminals 51 by, for example, soldering.

According to the third embodiment, as illustrated in FIG. 9, only the middle primary coil 11h can be removed from the main body 13 in a state where the middle primary coil 11h and the primary coils 11g and 11i on both sides of and adjacent to the middle primary coil 11h are attached to the main body 13. Therefore, only any one of the primary coils 11a to 11i of the primary coils 11a to 11i can be easily removed from the main body 13.

The present invention is not limited to the realization of the above embodiments, and can be realized in various embodiments within the scope that does not change the gist of the present invention.

In the above embodiments, the example where the coil unit connection structure of the present invention is applied to a wireless power transfer apparatus of an X table is described. However, the coil unit connection structure of the present invention can also be applied to a wireless power transfer apparatus of, for example, an XY table other than the X table. Moreover, the coil unit connection structure of the present invention can also be applied to, for example, a motor, a transformer, or various electronic devices other than the wireless power transfer apparatus.

The description is based on Japanese Patent Application No. 2017-093611 filed on May 10, 2017, the entire contents of which are incorporated herein.

REFERENCE SIGNS LIST 11a to 11i Primary coil (coil unit)
11i Primary coil at the terminal end (coil unit at the terminal end)
15 Terminal unit
21 Coil
22 Core
23 Coil base
33 Return wire
38 Connecting wire 31 First terminal (terminal)
32 Second terminal (terminal)
34 First relay (relay)
34a Opening
35 Second relay (relay)
35a Opening
41 First terminal (terminal)
41a Opening
42 Second terminal (terminal)
42a Opening
43 First relay (relay)
44 Second relay (relay)
51 First terminal (terminal)
51a Opening
52 First relay (relay)

The invention claimed is:

1. A coil unit connection structures comprising:
a plurality of segmented coil units, each of the coil units including a coil and a return wire, a plurality of the coils of the plurality of coil units being electrically connected to each other, a plurality of the return wires of the plurality of coil units being electrically connected to each other,
wherein portions of the coil unit connection structure at which a power cable is configured to connect are disposed at only one side of the coil unit connection structure in an arrangement direction of the plurality of segmented coil units.

2. The coil unit connection structure according to claim 1, wherein each of the segmented coil units includes a core around which the coil is wound, and a coil base that supports the core.

3. The coil unit connection structure according to claim 1, wherein
each of the segmented coil units includes a first terminal electrically connected to the coil, and a second terminal electrically connected to the return wire,
the first terminals of the segmented coil units adjacent to each other are electrically connected to each other via a first relay detachable from the first terminals, and
the second terminals of the segmented coil units adjacent to each other are electrically connected to each other via a second relay detachable from the second terminals.

4. The coil unit connection structure according to claim 3, wherein each of the segmented coil units includes a core around which the coil is wound, and a coil base that supports the core.

5. The coil unit connection structure according to claim 1, further comprising:
a terminal unit including a connecting wire that electrically connects the coil and the return wire of the coil unit at a terminal end.

6. The coil unit connection structure according to claim 5, wherein
each of the segmented coil units includes a first terminal electrically connected to the coil, and a second terminal electrically connected to the return wire,
the first terminals of the segmented coil units adjacent to each other are electrically connected to each other via a first relay detachable from the first terminals, and
the second terminals of the segmented coil units adjacent to each other are electrically connected to each other via a second relay detachable from the second terminals.

7. The coil unit connection structure according to claim 6, wherein each of the segmented coil units includes a core around which the coil is wound, and a coil base that supports the core.

8. The coil unit connection structure according to claim 5, wherein each of the segmented coil units includes a core around which the coil is wound, and a coil base that supports the core.

* * * * *